(12) United States Patent
Choi

(10) Patent No.: US 7,657,788 B2
(45) Date of Patent: Feb. 2, 2010

(54) HOST APPARATUS FOR SENSING FAILURE OF EXTERNAL DEVICE CONNECTED THROUGH COMMUNICATION CABLE AND A METHOD THEREOF

(75) Inventor: Jung-hwa Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 11/135,365

(22) Filed: May 24, 2005

(65) Prior Publication Data

US 2006/0031720 A1   Feb. 9, 2006

(30) Foreign Application Priority Data

Aug. 4, 2004   (KR) .................. 10-2004-0061328

(51) Int. Cl.
  *G06F 11/00*   (2006.01)
(52) U.S. Cl. .......................................... 714/22; 714/56
(58) Field of Classification Search .................. 714/22, 714/43, 56, 14, 44, 47, 48; 710/7, 15, 65; 713/300, 310, 330, 340
See application file for complete search history.

(56) References Cited

U.S. PATENT DOCUMENTS

| 5,938,770 | A |   | 8/1999 | Kim |  |
|---|---|---|---|---|---|
| 6,000,042 | A | * | 12/1999 | Henrie | 714/40 |
| 6,047,222 | A | * | 4/2000 | Burns et al. | 700/79 |
| 6,125,455 | A | * | 9/2000 | Yeo | 714/14 |
| 6,671,831 | B1 | * | 12/2003 | Sartore et al. | 714/44 |
| 6,839,055 | B1 | * | 1/2005 | Nguyen | 345/204 |
| 7,124,307 | B2 | * | 10/2006 | Sugita et al. | 713/300 |
| 7,290,171 | B2 | * | 10/2007 | Saotome | 714/22 |
| 2001/0020283 | A1 | * | 9/2001 | Sakaguchi | 714/22 |
| 2002/0052706 | A1 | * | 5/2002 | Odaohhara et al. | 702/119 |
| 2002/0184568 | A1 | * | 12/2002 | Kurrasch | 714/39 |
| 2002/0194547 | A1 | * | 12/2002 | Christensen et al. | 714/43 |
| 2003/0014536 | A1 | * | 1/2003 | Christensen et al. | 709/238 |
| 2003/0040881 | A1 | * | 2/2003 | Steger et al. | 702/123 |
| 2003/0172318 | A1 |   | 9/2003 | Sugita et al. |  |
| 2005/0028046 | A1 | * | 2/2005 | McArdle | 714/48 |
| 2005/0071733 | A1 | * | 3/2005 | Fukae et al. | 714/776 |

FOREIGN PATENT DOCUMENTS

| CN | 1444151 A | 9/2003 |
|---|---|---|
| JP | 6-276073 A | 9/1994 |
| JP | 2001-006518 A | 1/2001 |
| JP | 2002-353994 A | 12/2002 |
| KR | 1998-050442 U | 10/1998 |
| KR | 1999-0066345 A | 8/1999 |
| KR | 2003-0058184 A | 7/2003 |

* cited by examiner

*Primary Examiner*—Dieu-Minh Le
(74) *Attorney, Agent, or Firm*—Sughrue Mion, PLLC

(57) ABSTRACT

A host apparatus capable of sensing failure in an external device connected thereto through communication cable, comprises an external signal detector for sensing failure in the external device by detecting signals of the external device through the communication cable; a display for outputting a predetermined message; and a controller for displaying a predetermined warning message informing the failure on the display, if the external signal detector senses the failure in the external device. Therefore, a user can be informed of the failure in the external device.

4 Claims, 5 Drawing Sheets

HOST APPARATUS FOR SENSING FAILURE OF EXTERNAL DEVICE CONNECTED THROUGH COMMUNICATION CABLE AND A METHOD THEREOF

CROSS-REFERENCE TO RELATED APPLICATIONS

This application claims the benefit of Korean Patent Application No. 2004-61328 filed Aug. 4, 2004, in the Korean Intellectual Property Office, the disclosure of which is incorporated herein by reference.

BACKGROUND OF THE INVENTION

1. Field of the Invention

The present invention relates to a host apparatus and a method for sensing failure in an external device connected through a communication cable. More particularly, the present invention relates to a host apparatus and a method for sensing failure in a power line and/or a data transmission line of an external device and informing a user of the failure.

2. Description of the Related Art

Recently, external devices such as Moving Picture Experts Group audio layer-3 (MP3) players and personal digital assistants (PDAs) have been produced without an internal power source. Instead, power is supplied from a host apparatus, such as a personal computer (PC), to allow for miniaturization and light weight. Likewise, as set-top boxes become miniaturized and light-weight, power may be supplied from a digital television (DTV) through a communication cable. The external device connected with the host apparatus through a communication cable such as a universal serial bus (USB) cable can be supplied with power from the host apparatus and perform data communication with the host apparatus.

FIG. 1 is a block diagram showing a conventional host apparatus for supplying power to an external device. The conventional host apparatus 10 comprises a power source 12, a power protector 14, and a communication port 16. The power source 12 receives an alternating current power of 110V or 220V from an alternating current power source 19 and converts the alternating current power into a power corresponding to the rated range of the host apparatus 10 and the external device 18. The power protector 14 shuts off the connection between the external device 18 and the power source 12, if the power source 12 provides a power beyond the rated range of the external device 18 to the external device 18. In other words, if the power line of the external device 18 is grounded or short-circuited with the data transmission line, an over current is supplied from the power source 12 to the external device 18. The power protector 14 such as a fuse shuts off the over current. Also, if the power is supplied abnormally to the external device 18 due to a problem in the power source 12, the power protector 14 shuts off the abnormal current. The communication port 16 is connected to the external device 18 through the communication cable.

In the above-described conventional method, if the external device 18 is connected to the host apparatus 10 and if the power supplied to the external device 18 is shut off to stop the operation of the external device 18, the user cannot determine whether the failure originates from the host apparatus 10 or from the external device 18.

SUMMARY OF THE INVENTION

An aspect of the present invention is to solve at least the above problems and/or disadvantages and to provide at least the advantages described below. Accordingly, an aspect of the present invention is to provide a host apparatus that can inform a user of failure in an external device by sensing and displaying the failure on a screen, if failure occurs in the external device connected to the host apparatus through a communication cable.

In order to achieve the above-described aspects of the present invention, there is provided a host apparatus communicating with at least one external device through a communication cable, which includes: an external signal detector for sensing failure in the external device by detecting signals of the external device through the communication cable; a display for outputting a predetermined message; and a controller for displaying a predetermined warning message informing of the failure on the display, if the external signal detector senses the failure in the external device.

The external signal detector detects power signals supplied through the communication cable and senses whether there is failure in a power line of the external device based on whether there is a change in the power signals.

Also, the external signal detector detects data signals supplied through the communication cable and senses whether there is failure in a data transmission line of the external device based on whether there is a change in a signal level and signal waveform of the data signals.

The host apparatus utilizes a communication cable compatible with at least one of a Universal Serial Bus (USB) format, an Institute of Electrical and Electronics Engineers (IEEE) 1394 format, a digital visual interface (DVI) format, and a Personal Computer Memory Card International Association (PCMCIA) format.

In accordance with another aspect of the present invention, there is provided a method for sensing failure in a host apparatus connected with at least one external device through a communication cable, the method which includes the steps of: a) detecting signals of the external device through the communication cable and sensing whether there is failure in the external device; and b) if failure is sensed in the external device, outputting a message corresponding to the failure.

Preferably, but not necessarily, power signals supplied through the communication cable are detected and the presence of failure in a power line of the external device is sensed based on whether there is a change in the power signals in the step a).

In addition, data signals supplied through the communication cable are detected and the presence of failure in a data transmission line of the external device is sensed based on whether there is a change in a signal level and signal waveform of the data signals in the step a).

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
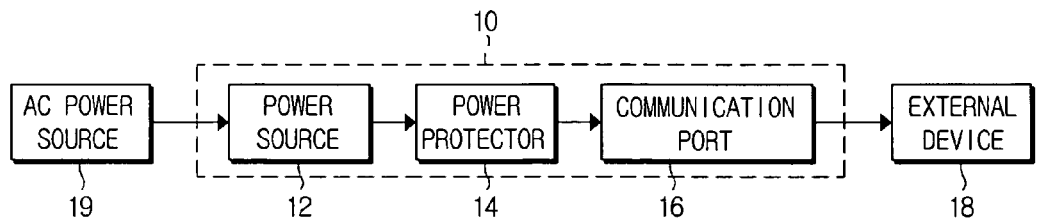
FIG. 1 is a block diagram showing a conventional host apparatus providing power to an external device.

Certain embodiments of the present invention will be described in greater detail with reference to the accompanying drawings.

In the following description, the same drawing reference numerals are used for the same elements even in different drawings. Detailed descriptions of certain items such as particular construction details and details of certain elements are only provided to assist in a comprehensive understanding of the invention. Thus, it is apparent that the present invention can be carried out without those particular details. Also, well-known functions or constructions are not described in detail since they would obscure the invention in unnecessary detail.

Figure 2:
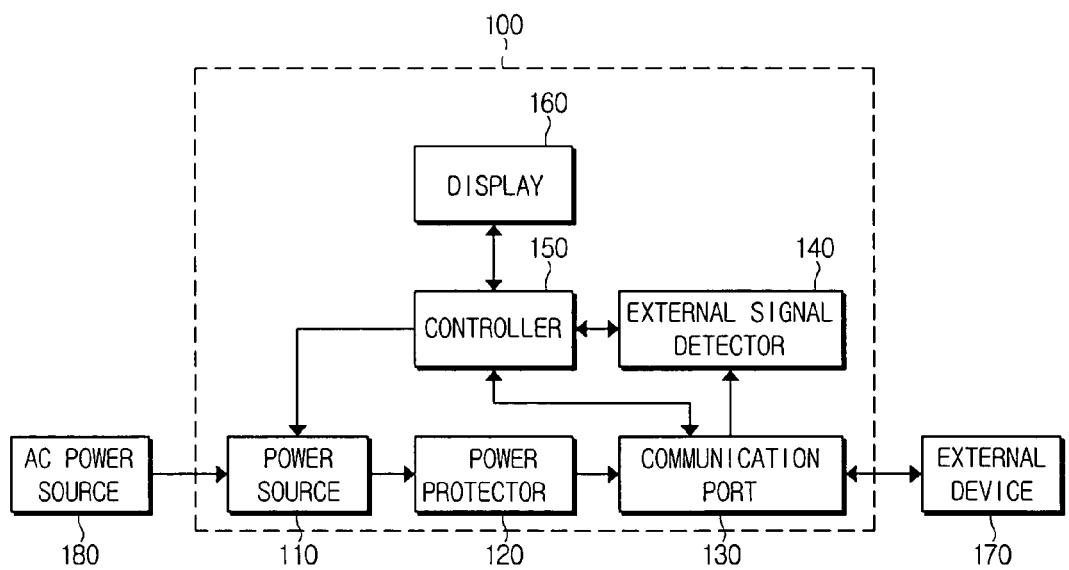
FIG. 2 is a block diagram illustrating a host apparatus in accordance with an embodiment of the present invention.

FIG. 2 is a block diagram illustrating a host apparatus in accordance with an exemplary embodiment of the present invention. The host apparatus of the present invention 100 comprises a power source 110, a power protector 120, a communication port 130, an external signal detector 140, a controller 150, and a display 160.

The power source 110 receives an 110V or 220V alternating current (AC) power from an AC power source 180 and supplies the power to operate the host apparatus 100 and an external device 170. That is, power source 110 converts the power from AC power source 180 into power corresponding to the rated ranges of the host apparatus 100 and the external device 170 and provides them to the host apparatus 100 and the external device 170.

If the power supplied from the power source 110 is beyond the rated range of the external device 170, the power protector 120 shuts off the connection between the external device 170 and the power source 110. For example, if the power line of the communication cable is short-circuited or if a great deal of load is caused due to generation of an error in the connection with the external device 170, an over current flows through the power protector 120. In this case, the power protector 120 stops supplying the power in order to protect the external device 170 from the flow of the over current.

The communication port 130 is connected with the external device 170 through communication cable. The communication cable connected to the external device 170 may be any of many types of communication cable that are connectable with the external device 170 and that can perform data communication as well as supply power. Examples of such types of communication cable include a universal serial bus (USB) cable, an Institute of Electrical and Electronics Engineers (IEEE) 1394 cable, a digital visual interface (DVI) cable, and a Personal Computer Memory Card International Association (PCMCIA) cable.

The external signal detector 140 senses failure in the power line and data transmission line of the external device 170. More specifically, the external signal detector 140 detects power signals supplied through the communication cable when power is supplied and senses failure in the power line of the external device 170 based on whether there is a change in the power signals. Also, the external signal detector 140 detects data signals transmitted through the communication cable and senses failure in the data transmission line of the external device 170 based on whether there is a change in the signal level and waveform of the data signals.

The display 160 displays a message corresponding to the failure sensed in the external signal detector 140. If failure in the power line is sensed through the power line, the display 160 shows a message 'failure is found in the power line of an external device' on a screen. If failure in the data transmission line is sensed, the display 160 shows a message 'failure is found in the data transmission line of an external device' on the screen.

The controller 150 transmits and receives data to be communicated with the external device 170 through the communication port 130 and controls the external signal detector 140 to sense failure with the external device 170. In other words, if the external device 170 is connected to the communication port 130, the controller 150 recognizes the connection and controls the power source 110 to supply power to it. Also, if the power is supplied to the external device 170 and there is failure in the power line, the controller 150 senses the failure from the power line and controls the external signal detector 140 to sense dysfunction of the external device 170 through the data communication line and outputs a message corresponding to the sensed failure to the display 160.

Figure 3:
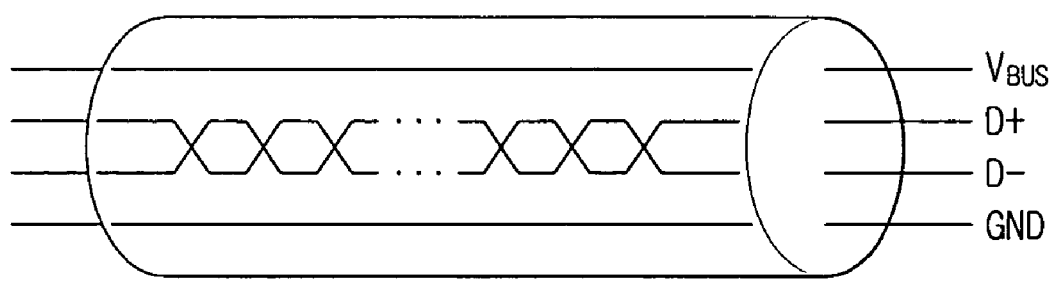
FIG. 3 is an exemplary diagram describing a communication cable connecting the host apparatus and the external device in accordance with an embodiment of the present invention.

FIG. 3 is an exemplary diagram describing a communication cable connecting the host apparatus and the external device in accordance with an embodiment of the present invention. The communication cable shown in the drawing is a USB cable. The USB method is the same as a serial method but faster. Also, the USB can connect as many as 127 external devices 170 to the host apparatus 100. The external device 170 performs data communication with the host apparatus 100 through the USB cable and receives power from the host apparatus 100. Generally, about 5V/500 mA of power can be supplied from the host apparatus 100 to an external device 170 through a line of USB cable.

Referring to FIG. 3, the USB cable comprises four lines: VBUS, D+, D−, and ground (GND). The $V_{BUS}$ supplies power from the power source 110 to the external device 170. If the $V_{BUS}$ line is short-circuited with the GND line or the data transmission line, over current comes to flow through the $V_{BUS}$ line and the power protector 120 shuts off the flow of the over current. Herein, the external signal detector 140 senses that the power is beyond the rated range of the external device 170 from the $V_{BUS}$ line. The GND line connects the grounds of the host apparatus 100 and the external device 170. The controller 150 can recognize the connection of the external device 170 from the GND line. The D+ and D− lines communicate data between the host apparatus 100 and the external device 170. They transmit data at a data transmission rate of 12 Mbps. Herein, the external signal detector 140 detects the signal level and signal waveform of the D+ and D− lines and senses whether there is failure in the external device 170.

Figure 4:
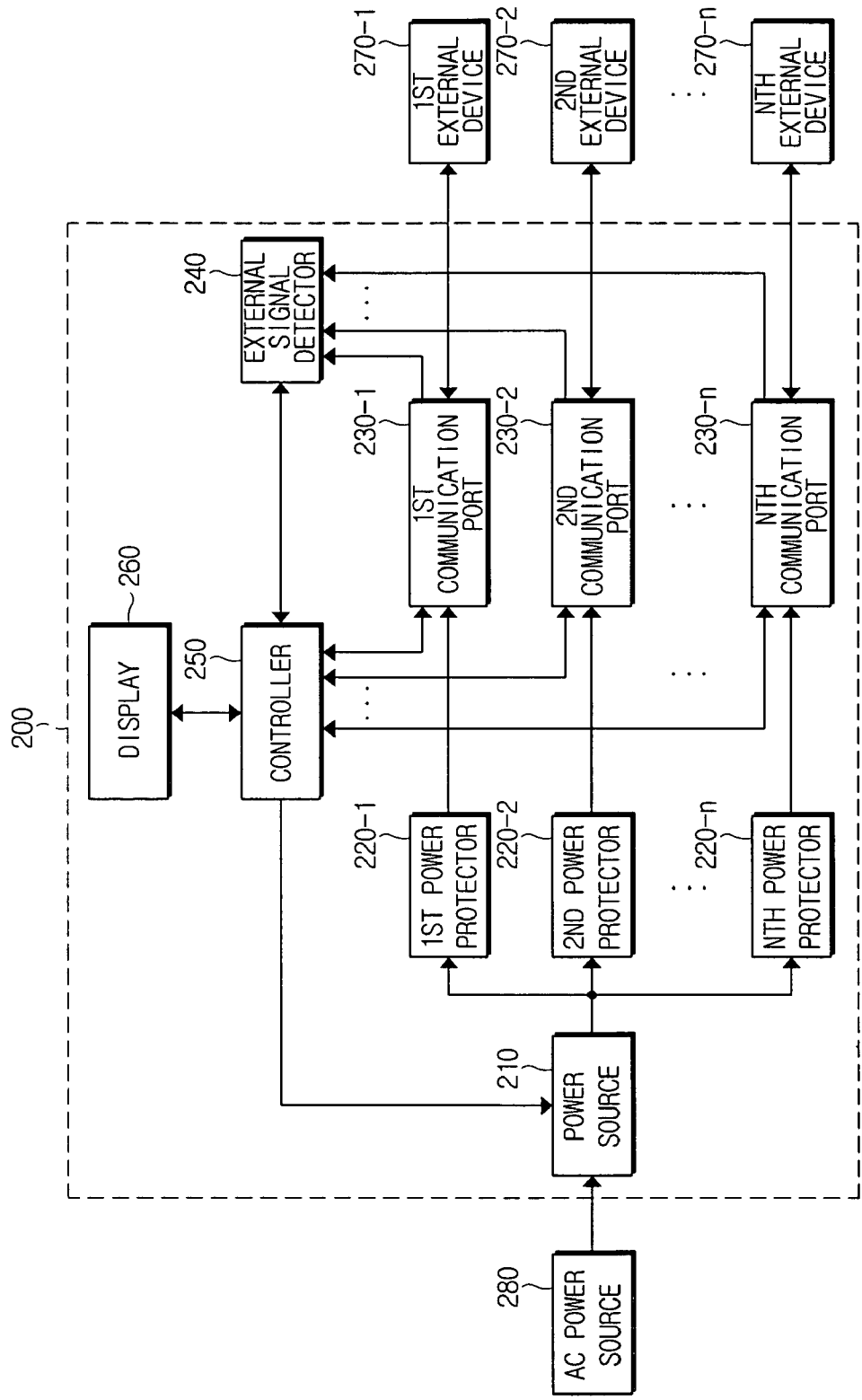
FIG. 4 is a block diagram describing a host apparatus and a plurality of external devices connected to the host apparatus in accordance with another embodiment of the present invention.

FIG. 4 is a block diagram describing a host apparatus and a plurality of external devices connected to the host apparatus in accordance with another embodiment of the present invention. Referring to FIG. 4, a plurality of external devices 270-1, 270-2, . . . , and 270-n are connected to the host apparatus 100 through communication cables. A power source 210 supplies power to the connected external devices 270-1, 270-2, . . . , and 270-n upon the connection. Herein, if the power supplied to the external devices 270-1, 270-2, . . . , and 270-n goes beyond the rated range, power protectors 230-1, 230-2, . . . , and 230-n corresponding to the external devices 270-1, 270-2, . . . , and 270-n shuts off the power supply from the power source 210.

The external signal detector 240 senses failure generated in the external devices 270-1, 270-2, . . . , and 270-n from a power line, a GND line, and a data transmission line of the external devices 270-1, 270-2, . . . , and 270-n connected to the host apparatus 100. The external signal detector 240 transmits the sensed failure to a controller 250, which controls a display 260 to inform a user of the failure by displaying the failure of the external devices 270-1, 270-2, . . . , and 270-n on a screen.

Figure 5:
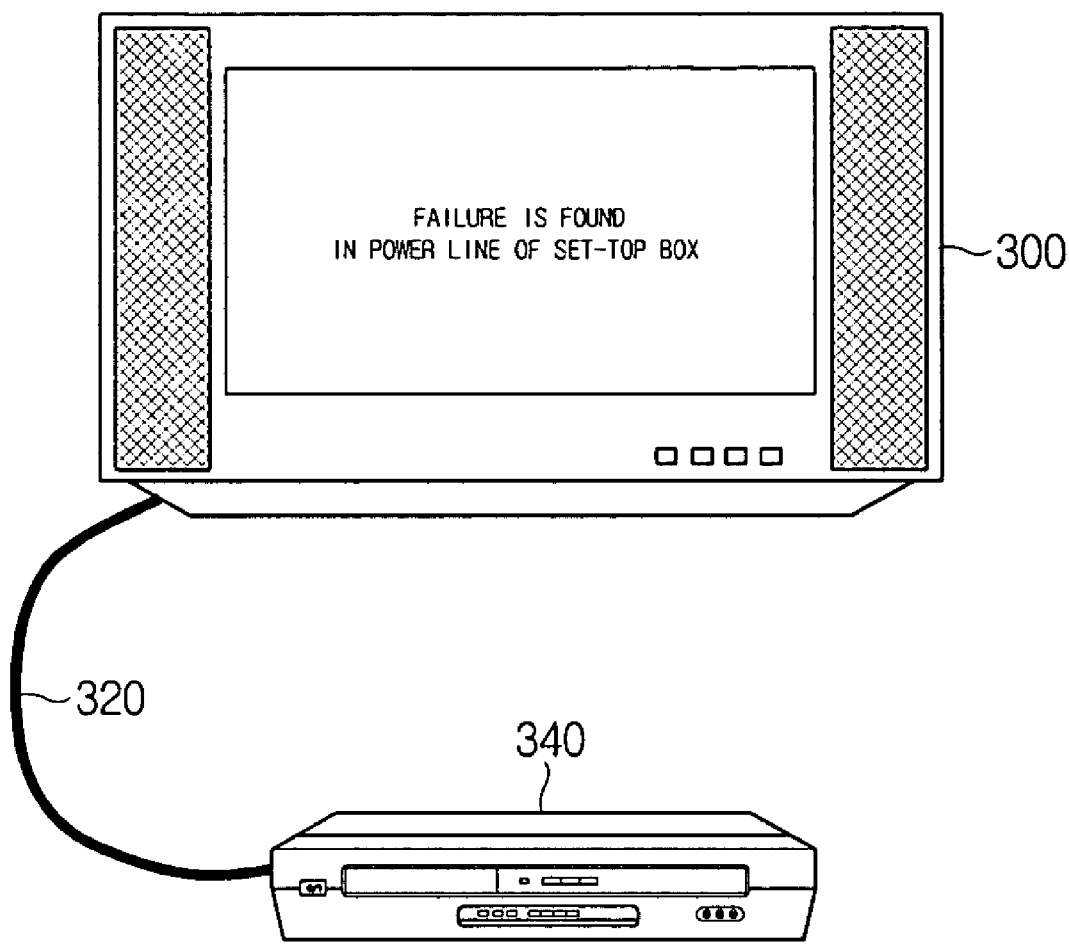
FIG. 5 is an exemplary diagram showing a screen of the host apparatus displaying occurrence of failure in the external device in accordance with an embodiment of the present invention.

FIG. 5 is an exemplary diagram showing a screen of the host apparatus displaying occurrence of failure in the external device in accordance with an embodiment of the present invention. In the drawing, a Digital Television (DTV) 300, i.e., the host apparatus, is connected with a set-top box 340, i.e., an external device, through the USB cable 320. If there is failure in the set-top box 340 connected to the DTV 300, the occurrence of failure is displayed on the screen. In short, failure in the power line which is sensed in the DTV 300 through the power line of the USB cable 320 is informed to the user on an on-screen-display (OSD) by a message such as 'failure is found in the power line of the set-top box.'

Figure 6:
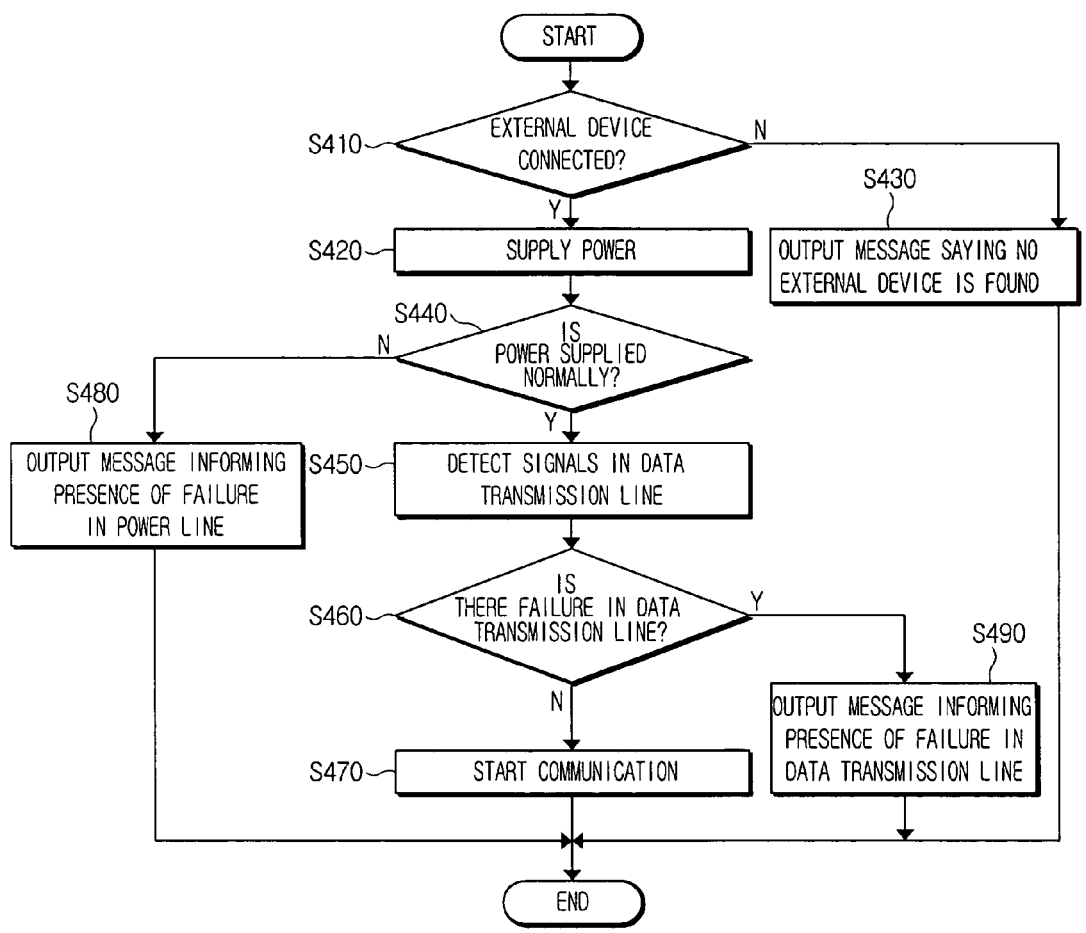
FIG. 6 is a flowchart describing a method of displaying failure of the external device on the screen of the host apparatus in accordance with an embodiment of the present invention.

FIG. 6 is a flowchart describing a method of displaying failure of the external device on the screen of the host apparatus in accordance with an embodiment of the present invention. Referring to FIG. 6, at step S410, it is checked whether the external device 170 is connected to the communication port 130 by sensing the GND line of the communication cable. If the external device 170 is connected to the communication cable, at step S420, power is supplied from the power source 110 to the external device 170. If it is determined that no external device 170 is connected to the communication port 130, at step S430, a message saying 'no external device is connected' is displayed.

At step S440, it is checked whether power is supplied normally through the power line. If the power is supplied normally, at step S450, the data transmission line is sensed to check whether there is failure in the data transmission line. At step S460, if it is determined that there is no failure in the data transmission line, at step S470, communication begins between the host apparatus 100 and the external device 170. If failure is sensed in the power line of the external device 170 at the step S440, at step S480, the failure is communicated to the user by displaying a message 'failure is found in the power line of the external device.' At the step S460, if failure is sensed in the data transmission line, at step S490, the failure is communicated to the user by displaying a message 'failure is found in the data transmission line of the external device.' Through these processes, failure in the external device 170 can be sensed and communicated to the user.

As described above, according to an embodiment of the present invention, the user can be informed of failure in the external device by sensing the failure in the external device through the external signal detector and displaying the occurrence of failure on the screen such as OSD in the form of a message.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A host apparatus communicating with an external device through a communication cable, comprising:
   an external signal detector for sensing failure in the external device by detecting data signals of the external device through the communication cable;
   a display; and
   a controller that causes a predetermined warning message informing of the failure to be displayed on the display, if the external signal detector senses the failure in the external device,
   wherein the external signal detector detects the data signals supplied through the communication cable and senses whether there is failure in the external device based on whether there is a change in a signal level and signal waveform of the data signals transmitted through a data transmission line included in the communication cable, and
   wherein the external signal detector further detects power signals supplied through the communication cable and senses whether there is failure in a power line of the external device based on whether there is a change in the power signals.

2. The host apparatus as recited in claim 1, wherein the communication cable is a communication cable compatible with at least one of a universal serial bus (USB) format, an Institute of Electrical and Electronics Engineers (IEEE) 1394 format, a digital visual interface (DVI) format, and a Personal Computer Memory Card International Association (PCMCIA) format.

3. The host apparatus as recited in claim 1, wherein the host apparatus communicates with a plurality of external devices through a plurality of communication cables, wherein the external signal detector is configured to sense failure in respective external devices, and wherein, if the external signal detector senses failure in a respective one of the external devices, the controller causes the display to display a predetermined warning message informing of the failure of the respective one of the external devices.

4. A method for sensing failure in a host apparatus connected with at least one external device through a communication cable, comprising:
   a) detecting data signals of the external device through the communication cable and sensing whether there is failure in the external device; and
   b) if failure is sensed in the external device, outputting a message corresponding to the failure,
   wherein the data signals supplied through the communication cable are detected and whether there is failure in the external device is sensed based on whether there is a change in a signal level and signal waveform of the data signals, in step a, transmitted through a data transmission line included in the communication cable, and
   wherein power signals supplied through the communication cable are further detected and whether there is failure in a power line of the external device is sensed based on whether there is a change in the power signals in step a).

* * * * *

UNITED STATES PATENT AND TRADEMARK OFFICE
CERTIFICATE OF CORRECTION

PATENT NO. : 7,657,788 B2  Page 1 of 1
APPLICATION NO. : 11/135365
DATED : February 2, 2010
INVENTOR(S) : Jung-hwa Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-eighth Day of December, 2010

David J. Kappos
*Director of the United States Patent and Trademark Office*